US011332647B2

(12) United States Patent
Holtan et al.

(10) Patent No.: US 11,332,647 B2
(45) Date of Patent: May 17, 2022

(54) MICROFIBRILLATED CELLULOSE AS RHEOLOGY MODIFIER IN ADHESIVES

(71) Applicant: Borregaard AS, Sarpsborg (NO)

(72) Inventors: Synnøve Holtan, Sarpsborg (NO); Katérina Liapis, Sarpsborg (NO); Jan Berg, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 0 days.

(21) Appl. No.: 16/637,245

(22) PCT Filed: Aug. 14, 2018

(86) PCT No.: PCT/EP2018/072008
§ 371 (c)(1),
(2) Date: Feb. 6, 2020

(87) PCT Pub. No.: WO2019/034644
PCT Pub. Date: Feb. 21, 2019

(65) Prior Publication Data
US 2020/0248042 A1 Aug. 6, 2020

(30) Foreign Application Priority Data

Aug. 14, 2017 (EP) .................................. 17186166
Aug. 14, 2017 (EP) .................................. 17186201
Jul. 6, 2018 (EP) .................................. 18182239

(51) Int. Cl.
| | | |
|---|---|---|
| C09J 11/08 | (2006.01) | |
| B32B 29/08 | (2006.01) | |
| C08J 3/00 | (2006.01) | |
| C09J 103/02 | (2006.01) | |
| D21J 1/08 | (2006.01) | |
| C08L 1/02 | (2006.01) | |
| C08L 29/04 | (2006.01) | |
| C09D 101/02 | (2006.01) | |
| C09D 129/04 | (2006.01) | |
| C09J 101/02 | (2006.01) | |
| C09J 129/04 | (2006.01) | |

(52) U.S. Cl.
CPC .............. *C09J 11/08* (2013.01); *B32B 29/08* (2013.01); *C08J 3/005* (2013.01); *C08L 1/02* (2013.01); *C08L 29/04* (2013.01); *C09D 101/02* (2013.01); *C09D 129/04* (2013.01); *C09J 101/02* (2013.01); *C09J 103/02* (2013.01); *C09J 129/04* (2013.01); *D21J 1/08* (2013.01); *C08J 2303/02* (2013.01); *C08J 2401/02* (2013.01)

(58) Field of Classification Search
CPC .............................. C09J 102/02; C09J 103/02
See application file for complete search history.

(56) References Cited

U.S. PATENT DOCUMENTS

| | | | |
|---|---|---|---|
| 2,884,389 A | 4/1959 | Corwin et al. | |
| 2,886,541 A | 5/1959 | Langlois et al. | |
| 3,294,716 A | 12/1966 | Pinney et al. | |
| 3,434,901 A | 3/1969 | Griffiths et al. | |
| 4,341,807 A | 7/1982 | Turbak et al. | |
| 4,374,702 A | 2/1983 | Turbak et al. | |
| 4,481,077 A | 11/1984 | Herrick | |
| 6,964,703 B2 | 11/2005 | Geeroms | |
| 10,337,146 B2 | 7/2019 | Holtan et al. | |
| 2010/0291822 A1* | 11/2010 | Netravali | B32B 5/026 442/153 |
| 2011/0081554 A1* | 4/2011 | Ankerfors | C09D 103/04 428/535 |
| 2012/0132383 A1* | 5/2012 | Laine | D21H 11/18 162/175 |
| 2012/0219816 A1* | 8/2012 | Heiskanen | D21H 19/34 428/535 |
| 2015/0233058 A1 | 8/2015 | Neumann | |
| 2016/0215179 A1 | 7/2016 | Sumnicht et al. | |
| 2017/0121908 A1* | 5/2017 | Holtan | D21B 1/06 |
| 2020/0270428 A1 | 8/2020 | Holtan et al. | |

FOREIGN PATENT DOCUMENTS

| | | |
|---|---|---|
| CN | 103590281 A | 2/2014 |
| CN | 105542676 A | 5/2016 |
| EP | 1101809 A1 | 5/2001 |
| EP | 2799618 A1 | 11/2014 |
| WO | WO-2006/079512 A1 | 8/2006 |
| WO | WO-2007/091942 A1 | 8/2007 |
| WO | WO-2014/022666 A1 | 2/2014 |
| WO | WO-2015/180844 A1 | 12/2015 |
| WO | WO-2018/083590 A1 | 5/2018 |

OTHER PUBLICATIONS

Jonjankiat (Effect of Microcrystalline Cellulose from Bagasse on the Adhesion Properties of Tapioca Starch and/or Polyvinyl alcohol based Adhesives, (A Thesis Submitted in Partial Fulfillment of the Requirements for the Degree of Master of Science in Packaging Technology), 147 pages, (2010)) (Year: 2010).*
H. Xu et al., Robust and Flexible Films from 100% Starch Cross-Linked by Biobased Disaccharide Derivative; ACS Sustainable Chem. Eng., 3:2631-2639, (2015).
International Search Report, PCT/EP2018/072008, dated Nov. 16, 2018, 4 pages.
International Search Report, PCT/EP2018/072017, dated Sep. 27, 2018, 4 pages.
Jonjankiat, Sunan, Effect of Microcrystalline Cellulose from Bagasse on the Adhesion Properties of Tapioca Starch and/or Polyvinyl alcohol based Adhesives, (A Thesis Submitted in Partial Fulfillment of the Requirements for the Degree of Master of Science in Packaging Technology), 147 pages, (2010) [Retrieved from the Internet: URL:http://kb.psu.ac.th/psukb/bitstream/2010/8532/1/344971.pdf] [retrieved on Oct. 12, 2017].

(Continued)

*Primary Examiner* — Liam J Heincer
(74) *Attorney, Agent, or Firm* — Choate, Hall & Stewart LLP; Michael D. Schmitt

(57) ABSTRACT

The present invention relates to starch-based adhesive compositions comprising microfibrillatedcellulose ("MFC"). In addition to microfibrillated cellulose, these adhesive compositions comprise at least one starch and/or at least one starch derivative.

20 Claims, 11 Drawing Sheets

(56) References Cited

OTHER PUBLICATIONS

Löpez-Suevos, F. et al., DMA analysis and wood bonding of PVAc latex reinforced with cellulose nanofibrils, Cellulose, Kluwer Academic Publishers (Dordrecht), NL, 17(2):387-398, (2010).
Written Opinion, PCT/EP2018/072008, dated Nov. 16, 2018, 5 pages.
Written Opinion, PCT/EP2018/072017, dated Sep. 27, 2018, 5 pages.

* cited by examiner

Reference sample (not in accordance with the present invention)

Starch-based adhesive with MFC (in accordance with the invention)

MICROFIBRILLATED CELLULOSE AS RHEOLOGY MODIFIER IN ADHESIVES

FIELD OF THE INVENTION

The present invention relates to starch-based adhesive compositions comprising microfibrillated cellulose ("MFC"). In addition to microfibrillated cellulose, these adhesive compositions comprise at least one starch and/or at least one starch derivative.

The present invention also relates to a process for making MFC-modified starch (derivative)-based adhesives.

The present invention also relates a process for making cardboard, as well as to cardboard comprising the starch-based adhesive composition.

The present invention also relates to the use of MFC as a rheology modifying additive in adhesive compositions, in particular in adhesive compositions comprising at least one starch and/or at least one starch derivative. The use of these MFC-modified and starch-based adhesives in the manufacture of corrugated cardboards is particularly preferred.

BACKGROUND OF THE INVENTION

Starch-based adhesives (or adhesives based on starch derivatives) are generally known, in particular in the paper industries.

For example, U.S. Pat. No. 3,434,901 discloses a suspension of raw or uncooked starch in a suitable liquid carrier. For example, raw corn, tapioca or potato starch, comprising up to 40% by weight of the adhesive, suspended in a carrier consisting of water and smaller amounts of cooked starch, borax and caustic soda would constitute a typical raw starch formulation. In this state, the starch has limited or no adhesive qualities. However, at a certain temperature, dependent upon the type of starch utilized and the kind and amount of additives dissolved in the carrier, the starch granules will absorb the liquid of suspension available and swell, causing gelation of the suspension. In this state the starch has superior adhesion abilities and will form a bond between many substrates, including paper.

U.S. Pat. Nos. 2,884,389 and 2,886,541 disclose that a starch based corrugating adhesive can be produced that is highly water resistant or waterproof in nature. These two patents disclose reacting phenolic compounds, such as resorcinol, with an aldehyde, such as formaldehyde, under alkaline conditions in the presence of pasted starch so as to form in situ a phenolic-aldehyde resin-starch reaction product. The teaching of these two patents has been employed on a commercial scale in the production of highly water-resistant to waterproof corrugated and laminated paperboard products. U.S. Pat. No. 3,294,716 teaches the addition of borax to the general phenol-aldehyde-starch formula, along with the reduction of concentration of the phenolic compound, to reduce costs and increase machine speed rates for particular corrugated paperboard products that do not require a high degree of water resistance.

CN 105 542 676 discloses the use of oxidized nanocellulose cellulose as a matrix for starch-based adhesives. The compositions generally comprise 100 parts of an oxidized nanocellulose pulp having an oxidation rate of 5-30%, 10-40 parts of starch, 2-5 parts of an oxidizing agent, 0.1-2 parts of a stabilizer, 0.1-2 parts of a preservative, and 0.1-2 parts of emulsified paraffin.

However, despite further developments regarding the formulation of starch based adhesives (or adhesives based on starch derivatives), the viscosity is commonly not stable enough over extended periods of time, in particular over a longer period of storage, nor is it stable under high shear. This is a problem for the use of starch (derivative)-based adhesives in various areas of application, in particular for making corrugated cardboards, i.e. in the process of gluing different paper sheets together.

Paper used for cardboards is typically more absorbent than paper used for other purposes which means that the water content in any adhesive used to bond these types of paper together should ideally be comparatively low and/or the adhesive should be formulated to not overly penetrate into the absorbent patent. This requirement may lead to further requirements in regard to controlling the overall viscosity.

SUMMARY OF THE PRESENT INVENTION

Based on the problems outlined above and in view of the prior art, it is an object of the present invention to provide starch based adhesives (or adhesives based on starch derivatives) that allow for improved viscosity control and avoid or minimize any of the disadvantages outlined above.

In accordance with a first aspect of the present invention, this problem and others is/are solved by an adhesive composition comprising:
- at least one starch and/or at least one starch derivative, in an amount of 5% w/w to 60% w/w, dry matter, of the overall adhesive composition;
- at least one solvent, said solvent preferably comprising or consisting of water, in an amount of 30% w/w to 95% w/w of the overall adhesive composition;
- microfibrillated cellulose in an amount of 0.001% w/w to 10% w/w, preferably 0.01% w/w to 10% w/w, dry matter, of the overall adhesive composition.

In embodiments of the invention, the amount of microfibrillated cellulose in said adhesive composition is from 0.01% dry matter to 10%, preferably from 0.05% to 5%, further preferably from 0.05% to 2%, most preferred from 0.05% to 0.15%.

In embodiments of the invention, the amount of microfibrillated cellulose in said adhesive composition is from 0.02% w/w, relative to the overall weight of the composition to 8% w/w, further preferably from 0.05% w/w to 0.5% w/w, and/or the amount of microfibrillated cellulose is from 0.003% w/w to 22% w/w, preferably 0.02% w/w to 20% w/w, preferably 0.04% w/w to 4% w/w, preferably from 0.1% w/w to 2% w/w, further preferably 0.2% w/w to 1.4% w/w, even further preferably 0.2% w/w to 0.6% w/w, as measured relative to the overall amount of starch in the adhesive composition.

In alternative embodiments of the invention, the amount of microfibrillated cellulose in said composition is from 0.001% w/w, relative to the overall weight of the composition to 0.03% w/w, preferably from 0.003% w/w to 0.03% w/w, further preferably from 0.007% w/w to 0.03% w/w, further preferably from 0.01% w/w to 0.03% w/w.

In embodiments of the invention, the amount of microfibrillated cellulose in said adhesive is from 0.003% w/w to 0.09% w/w, preferably 0.02% w/w to 0.09% w/w, preferably 0.008% w/w to 0.08% w/w, preferably 0.02% w/w to 0.08% w/w, as measured relative to the overall amount of starch in the adhesive composition.

The inventors have surprisingly found that comparatively low amounts of MFC can be used in starch-based adhesives, for example 10% w/w or less, or 5% w/w or less, while still achieving the advantages that MFC has as an additive, which advantages are described throughout the disclosure. Generally, the skilled person wants to keep the amount of additive needed as low as possible. Without wishing to be bound by theory, it is believed that the effect of using small amounts of MFC as an additive to significantly affect the properties of the overall adhesive composition is due to the network-forming (cross-linking) capabilities of MFC. Generally, if the amount of MFC is chosen too low, for example below 0.001% w/w, the cross-linked network may not be strong enough. Or, at even lower amounts, the amount of fibrils may be too low to form a continuous network. On the other hand, if too much MFC is present, for example more than 10% w/w, then the viscosity may be too high and the overall composition may be difficult to process.

In accordance with the present invention, the term "dry matter" (also: "solids content") refers to the amount of microfibrillated cellulose (and/or starch) remaining if all the solvent (typically water) is removed. The amount is then calculated as weight % relative to the overall weight of the adhesive composition (including solvent, starch and other adjuvants, if present).

In embodiments of the invention, the amount of solvent is from 30% to 80%, further preferably from 40% to 75% w/w or 55% w/w to 70%, w/w, relative to the overall adhesive composition.

In embodiments of the invention, the amount of starch and/or starch derivative is from 10% to 50%, dry matter, further preferably from 15% to 35%, w/w, relative to the overall adhesive composition.

In embodiments of the invention, the overall amount of starch in said composition is from 15% w/w to 50% w/w, preferably from 25% w/w to 48% w/w or from 22% w/w to 35% w/w, more preferably from 30% w/w to 46% w/w and further preferably from 35% w/w to 45% w/w, of the overall adhesive composition.

The inventors have surprisingly found that a higher amount of starch can be used in a starch-based adhesive composition that also comprises MFC, compared to the otherwise same composition that does not comprise MFC. Without wishing to be bound by theory, it is believed that this possibility to incorporate more starch into the overall composition is due to the thixotropic (shear thinning) capabilities of MFC. During storage, MFC stabilizes the dispersion, which maintains stable (high) viscosity. In processing (e.g. applying the adhesive on flute and/or liner of a cardboard), the shear thinning properties of MFC allow to spread and apply the overall composition even if the same comprises a large amount of starch that would otherwise make continuous processing difficult.

In embodiments of the invention, the at least one starch is a native starch, or a chemically or a physically modified starch, or a mixture thereof.

In embodiments of the invention, the adhesive composition comprises no cross-linking agent other than microfibrillated cellulose or borax, preferably only comprises microfibrillated cellulose as a cross-linking agent.

In accordance with the present invention, although "borax" and boric acid are generally understood to not be the same compound; [borax is a salt of boric acid, i.e. borax is sodium (tetra)borate, while boric acid is hydrogen borate], whenever the term "borax" is used, the term refers to boric acid and its alkaline metal salts. In particular, a number of related minerals or chemical compounds that differ primarily in their crystal water content are referred to as "borax" and are included within the scope of the present invention, in particular the decahydrate. Commercially sold borax is typically partially dehydrated. In accordance with the present invention the term "borax" also encompasses boric acid or borax derivatives, e.g. boric acid or borax that has been chemically or physically modified.

In embodiments MFC can be used advantageously to replace parts or all of the borax as typically used as an additive in starch based adhesive. In embodiments of the invention, the adhesive composition comprises no, or only trace amounts, of borax. In preferred embodiments, said "traces" amount to less than 1000 ppm, preferably less than 500 ppm, further preferably less than 200 ppm, further preferably less than 100 ppm.

Unless explicitly stated otherwise, all ranges or values given for the amount of any component in the compositions of the present invention are meant to be given in weight % of the component relative to the overall weight of the adhesive composition ("w/w").

The adhesive compositions according to the present inventions may comprise other components, in particular caustic soda, borax and/or at least one preservative.

In accordance with the present invention, an "adhesive" is understood to be a material that is applied to the surfaces of articles to join these surfaces permanently by an adhesive bonding process. An adhesive is a substance capable of forming bonds to each of the two parts, wherein the final object consists of two sections that are bonded together. A particular feature of adhesives is the relatively small quantities that are required compared to the weight of the final object.

In accordance with the present invention, a starch is a polymeric carbohydrate consisting of a large number of glucose units joined by glycosidic bonds. Preferred sources for starch are potatoes, wheat, maize (corn), rice, tapioca and sago, among others.

In accordance with the present invention, a modified starch is a starch that has been chemically modified, for example by hydrolysis. Preferred modified starches in embodiments of the present invention are dextrins.

In embodiments of the present invention, the starch preferably is unmodified wheat starch, but can be any of the starches commonly used in an adhesive, that is, all starches and derivatives, which contain sufficient available hydroxyl groups so that a copolymerization reaction can occur between them and other reactants.

Microfibrillated cellulose (also known as "reticulated" cellulose or as "superfine" cellulose, or as "cellulose nanofibrils", among others) is a cellulose-based product and is described, for example, in U.S. Pat. Nos. 4,481,077, 4,374,702 and 4,341,807. In accordance with the present invention, microfibrillated cellulose has at least one reduced length scale (diameter, fiber length) vis-à-vis non-fibrillated cellulose. In (non-fibrillated) cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 μm (with the length of these fibres being even greater). When the cellulose fibres are microfibrillated, a heterogeneous mixture of "released" fibrils with cross-sectional dimensions and lengths from nm to μm may result. Fibrils and bundles of fibrils may co-exist in the resulting microfibrillated cellulose. The diameter of the microbrillated cellulose of the present invention is typically in the nanometer range.

In the microfibrillated cellulose ('MFC') as described throughout the present disclosure, individual fibrils or fibril bundles can be identified and easily discerned by way of conventional optical microscopy, for example at a magnification of 40×, and/or by electron microscopy.

In embodiments, the microfibrillated cellulose in accordance with the present invention is characterized, among others, by at least one of the following features:

The microfibrillated cellulose results in a gel-like dispersion that has a zero shear viscosity, $\eta_0$, of at least 2000 Pa·s, preferably at least 3000 Pa·s, preferably at least 4000 Pa·s, preferably at least 5000 Pa·s, preferably at least 6000 Pa·s, further preferably at least 7000 Pa·s, as measured in polyethylene glycol (PEG) as the solvent, and at a solids content of the MFC of 0.65%.

The zero shear viscosity, $\eta_0$ ("viscosity at rest") is a measure for the stability of the three-dimensional network making up the gel-like dispersion.

The "zero shear viscosity" as disclosed and claimed herein is measured as described in the following. Specifically, the rheological characterization of the MFC dispersions ("comparative" and "in accordance with the invention") was performed with PEG 400 as the solvent. "PEG 400" is a polyethylene glycol with a molecular weight between 380 and 420 g/mol and is widely used in pharmaceutical applications and therefore commonly known and available.

The rheological properties, in particular zero shear viscosity was/were measured on a rheometer of the type Anton Paar Physica MCR 301. The temperature in all measurements was 25° C. and a "plate-plate" geometry was used (diameter: 50 mm). The rheological measurement was performed as an oscillating measurement (amplitude sweep) to evaluate the degree of structure in the dispersions and as rotational viscosity measurements, in which case the viscosity was measured as a function of the shear rate to evaluate the viscosity at rest (shear forces→0), as well as the shear thinning properties of the dispersions. The measurement method is further described in PCT/EP2015/001103 (EP 3 149 241).

In embodiments, the microfibrillated cellulose has a water holding capacity (water retention capacity) of more than 30, preferably more than 40, preferably more than 50, preferably more than 60, preferably more than 70, preferably more than 75, preferably more than 80, preferably more than 90, further preferably more than 100. The water holding capacity describes the ability of the MFC to retain water within the MFC structure and this again relates to the accessible surface area. The water holding capacity is measured by diluting the MFC samples to a 0.3% solids content in water and then centrifuging the samples at 1000 G for 15 minutes. The clear water phase was separated from the sediment and the sediment was weighed. The water holding capacity is given as (mV/mT)−1 where mV is the weight of the wet sediment and mT is the weight of dry MFC analyzed. The measurement method is further described in PCT/EP2015/001103 (EP 3 149 241).

Without wishing to be bound by theory, the good water retention properties of MFC, including network forming of MFC with starch, are advantageous in avoiding the leaching of water from the adhesive into the cardboard during processing.

In embodiments of the invention, the MFC has a Schopper-Riegler (SR) value as obtained in accordance with the standard as defined in EN ISO 5267-1 (in the version of 1999) of below 95, preferably below 90, or, in the alternative, cannot be reasonably measured in accordance with the Schopper-Riegler method, as the MFC fibers are so small that a large fraction of these fibers simply passes through the screen as defined in the SR method.

In embodiments of the invention, the microfibrillated cellulose is a non-modified (native) microfibrillated cellulose, preferably a non-modified microfibrillated cellulose derived from plant material.

In accordance with a second aspect of the present invention, the above-mentioned problem and others is/are solved by a process for preparing a starch-based adhesive, or an adhesive based on a starch derivative, which process comprises the steps of:

(i) mixing at least one starch and/or at least one starch derivative with at least one solvent, in particular a solvent comprising or consisting of water, to result in mixture having a predetermined viscosity;

(ii) optionally adding one or more additives to the mixture from (i)

(iii) during or after step (i) or during or after optional step (ii): adding 0.1% to 25% w/w of microfibrillated cellulose, relative to the overall weight of the mixture from step (i) or from step (ii), preferably 0.5% to 10%, in a solvent, to said mixture, wherein the solids content of said microfibrillated cellulose in said solvent is from 1% dry weight, relative to the weight of the solvent, to 20%, preferably 2% to 10% dry weight, and:
dispersing the microfibrillated cellulose until a homogeneous mixture is obtained.

All embodiments as disclosed above in regard to the composition apply, mutatis mutandis, also to the process, in particular in regard to the properties and the relative amounts of MFC, starch and solvent.

In embodiments of the present invention, the viscosity of the mixture increases by at least 10%, preferably at least 25%, further preferably by at least 35%, in step (iii) and relative to viscosity of the mixture of step (i) or step (ii).

In an alternative process for preparing a starch-based adhesive, or an adhesive based on a starch derivative, said process comprises the steps of:

(a) mixing at least one starch and/or at least one starch derivative, or a mixture thereof, with at least one solvent, in particular a solvent comprising or consisting of water, (b) optionally adding one or more additives to the mixture from (a);

(c) during or after step (a), or during or after optional step (b): adding microfibrillated cellulose, which is preferably present in a solvent, preferably a solvent comprising or essentially consisting of water, (d) optionally adding alkaline, preferably alkali hydroxide, further preferably NaOH, to the mixture of (a) and/or the mixture of (b) and/or the mixture of (c), in a ratio dry alkaline, preferably alkali hydroxide, further preferably NaOH, preferably in amount relative to dry starch of from 0.1% w/w to 3% w/w, further preferably 0.5% w/w to 2% w/w;

(e) optionally adding a further amount of the at least one solvent, in particular a solvent comprising or consisting of water to the mixture of (b) and/or (c) and/or (d);

(f) optionally adding a further amount at least one starch/ or at least one starch derivative, or a mixture thereof, and/or a further amount of microfibrillated cellulose to the mixture of (b), (c) and/or (d)

(g) dispersing the mixture of (c), (d), (e) or (f) until a homogeneous mixture is obtained.

The process may include any further steps, in any sequence, and may include any repetition of any or all of steps (a) through (g).

In particular, further alkaline may be added after step (d) and/or further additives may be added after any or all of steps (c) through (f)

The viscosity is determined as the "Lory viscosity" in units of "seconds" and determined by the following method. Lory viscosity is measured with a Lory viscosity cup (Elcometer model 2215/1), according to standards ASTM D 1084-D or ASTM D4212. The Elcometer device consists of a conventional cylindrical cup with a needle fixed to the bottom. The cup is first dipped into the adhesive, which then empties through an escape hole. The flow time is measured as soon as the point of the needle is discernible.

In embodiments of the present invention, caustic soda and/or borax is/are added as part of step (ii), in order to initiate at least partial swelling of the starch and/or the starch derivative.

In embodiments of the present invention, in step (i), first a primary starch is added to a predetermined amount of solvent until a predetermined viscosity is achieved in step (i) or in step (ii), then, second, secondary starch (a second amount of the same or of different starch or starch derivative) is added, preferably secondary starch and borax are added.

In embodiments of the present invention, the pH value of the final adhesive composition is from 8 to 14, preferably from 10 to 13, further preferably from 11.5 to 12.5.

In accordance with a third aspect of the present invention, the above-mentioned problem and others is/are solved by providing microfibrillated cellulose for use as a rheology modifying agent in adhesives comprising starch and/or starch derivatives.

Without wishing to be bound by theory, it is believed that the addition of microfibrillated cellulose to a starch (derivative)-based adhesive leads to a network structure based on physical and/or chemical interactions between the microfibrillated cellulose units and the starch (derivative) units by way of hydrogen bonding. It is believed that microfibrillated cellulose is an efficient thickener in polar solvent systems, in particular in water, and builds large three dimensional networks of fibrils which are stabilized by hydrogen bonds.

These fibrils have hydroxyl groups on the surface that are dissociated ($O^-$) at the high pH prevailing in starch adhesives, this leading to intra and inter-particular interactions. As described above, starch is composed of amylose and amylopectin. Amylose is a helical linear polymer composed of $\alpha(1{\rightarrow}4)$-bound D-glucose units, with hydroxyl groups which are pointed towards outside the helix. The fibril network of microfibrillated cellulose is believed to interact through hydrogen bonding with those groups, building up a protective layer around the amylose chains, thus protecting the starch against high shear degradation and stabilizing the viscosity. Overall, MFC is a network of entangled fibrils that can entrap starch molecule and in that way strengthen the starch composition.

Furthermore, again without wishing to be bound by theory, the water holding capacity of microfibrillated cellulose is believed to prevent water from migrating to and through the paper. Therefore, adding microfibrillated cellulose to starch (derivative) based adhesives is particularly useful for the manufacture of corrugated cardboard, where water migration out of the adhesive into the paper destabilizes the final cardboard product and may lead to warp and delamination, among others.

In accordance with the present invention, using the composition according to the first aspect, or the composition as obtained in the method of the second aspect, in the manufacture of cardboards results in at least one of the following advantages, preferably essentially all of the following advantages, which may also be manifest in the resulting cardboard:

- Microfibrillated cellulose is well dispersible in starch (derivative)-based adhesives
- Microfibrillated cellulose can be used to adjust the viscosity of the final adhesive and stabilize the same over time, in particular during storage and also in regard to resistance under high shear
- Microfibrillated cellulose provides flexibility for viscosity corrections at any stage of the process
- Microfibrillated cellulose is thixotropic (i.e. shows shear thinning), higher overall viscosity can be tolerated
- Microfibrillated cellulose shows shear thinning, which improves adhesive application properties
- Microfibrillated cellulose increases the storage modulus of the starch adhesive, both in the liquid phase before curing and once the adhesive is cured (see FIGS. 6 and 10)
- Microfibrillated cellulose provides viscosity stability over time, in particular over a longer period of storage
- Microfibrillated cellulose provides viscosity stability under high shear impact
- Experiments on a line for making corrugated cardboard have shown that using a starch based adhesive comprising microfibrillated cellulose (as described below in the Examples Section) leads to an increase in production speed of 37% to achieve equal or better quality cardboard
- Microfibrillated cellulose improves the quality of the board by reducing water-based defects, which means that flatter boards are obtained, thus increasing speed of the post process steps (printing, cutting, stacking)
- Factory trials have shown that 33% reduction in glue consumption can be achieved when producing corrugated boards by using a starch based adhesive comprising microfibrillated cellulose
- Microfibrillated cellulose increases the time available to adjust and improves the process control during manufacturing of the corrugated boards; with microfibrillated cellulose in the starch based adhesive it is easier to remove warps and water defects on line by adjusting heat and pressure
- Microfibrillated cellulose improves the quality of the board by increasing the bond strength of the board
- Overall, using the adhesive composition according to the present invention results in stronger boards, for example as measured by the pin adhesion test PAT.

Therefore, in accordance with a fourth aspect of the present invention, the above-mentioned problem and others is/are solved by using the composition according to the first aspect, or the composition as obtained in the method of the second aspect, in the manufacture of corrugated paper boards/card boards.

In a further aspect, the present invention relates to a process for making corrugated paperboards or cardboards, wherein said process comprising at least the following steps:
- providing a starch-based adhesive composition according to any one of the embodiments as disclosed above, and
- applying said starch-based adhesive to at least a part of the tips of the flutes of a corrugated piece of paper, on at least one side, preferably on both sides; and
- in a corrugator, applying at least one liner onto said corrugated piece of paper, preferably applying a further liner on the other side of the corrugated piece of paper, and preparing a single, double, triple or further multiple wall cardboard, preferably in a continuous process.

In a further aspect, the present invention relates to corrugated paperboards or cardboards having at least one flute and at least one liner comprising the starch-based adhesive composition according to any one of the embodiments as disclosed above.

In a further aspect, the present invention relates to the use of the starch-based adhesive composition of any of the embodiments as disclosed above in the manufacture of corrugated paperboards or cardboards, including corrugated surface-coated boards.

In embodiments, the amount of microfibrillated cellulose in the adhesive composition as used in the manufacture of corrugated paperboards or cardboards is from 0.001% w/w, relative to the overall weight of the composition to 10% w/w, preferably from 0.01% w/w to 10% w/w, preferably from 0.02% w/w to 8% w/w, further preferably from 0.05% w/w to 5% w/w, further preferably from 0.05% w/w to 2% w/w, further preferably from 0.05% w/w to 0.5%, further preferably from 0.05% w/w to 0.15% w/w, or the amount of microfibrillated cellulose is from 0.003% w/w to 22% w/w, preferably 0.02% w/w to 20% w/w, preferably 0.04% w/w to 4% w/w, preferably 0.1% w/w to 2% w/w, further preferably 0.2% w/w to 1.4% w/w, even further preferably 0.2% w/w to 0.6% w/w, as measured relative to the overall amount of starch.

DETAILED DESCRIPTION OF THE INVENTION

Figure 1:
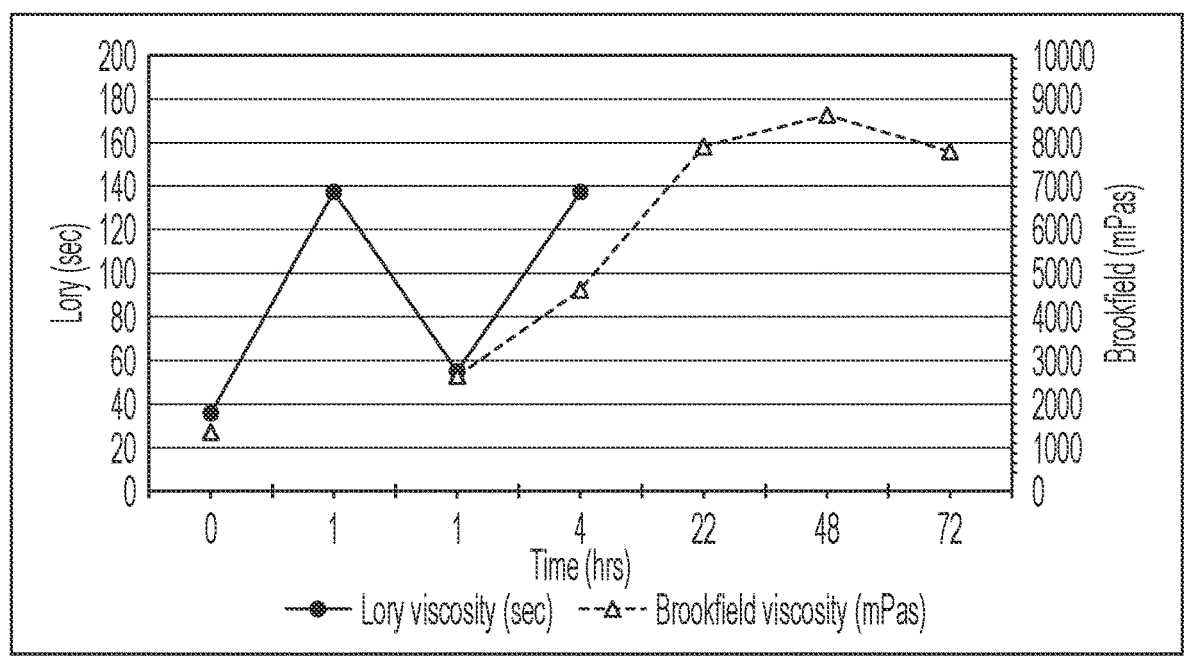
FIG. 1 is a plot of viscosity vs. time for a reference sample for Example 2 (details below).

In accordance with the present invention and as further specified in STM D 907-82, Standard Definitions of Terms Relating to Adhesives, published in Volume 15.06—Adhesives, 1984 Annual Book of ASTM Standards, an "adhesive" is understood to be a material that is applied to the surfaces of articles to join these surfaces permanently by an adhesive bonding process. An adhesive is a substance capable of forming bonds to each of the two parts when the final object consists of two sections that are bonded together. A particular feature of adhesives is the relatively small quantities that are required compared to the weight of the final objects.

In accordance with the present invention, a starch (also known as "amylum") is a polymeric consisting of a large number of glucose units joined by glycosidic bonds. Starch is found in large amounts in foods such as potatoes, wheat, maize (corn), rice, tapioca and sago, among others. Starch typically comprises two types of molecules: the linear and helical amylose and the branched amylopectin. Depending on the plant, starch generally contains 20 to 25% amylose and 75 to 80% amylopectin by weight.

While amylopectin can be supplied in cold-water-soluble form, amylose is generally insoluble. Amylose can be dissolved with strong alkali, for example by cooking with formaldehyde or by cooking in water at 150-160° C. under pressure. Upon cooling or neutralization, such amylose dispersions typically form gels at concentrations higher than 2% and will precipitate at concentrations lower than 2%. Amylose fractions are never truly soluble in water and in time will form crystalline aggregates by hydrogen bonding—a process known as retrogradation, or setback. Retrogradation is the cause of viscosity instability mentioned above and found to a varying degree in starch-based adhesives. Amylopectin is more soluble and less prone to retrogradation.

In embodiments of the present invention, the starch preferably is unmodified wheat starch, but can be any of the starches commonly used in the adhesive art, that is, all starches and derivatives, in particular dextrins which contain sufficient available hydroxyl and/or functional groups so that a copolymerization reaction can occur between them and the other two reactants.

A modified starch is a starch that has been chemically modified, for example by hydrolysis, to allow the starch to function properly under conditions frequently encountered during processing or storage, such as high heat, high shear, high pH, freeze/thaw and cooling. Preferred modified starches in embodiments of the present invention are dextrins.

Dextrins are a group of low-molecular-weight carbohydrates produced by the hydrolysis of starch or glycogen. Dextrins are mixtures of polymers of D-glucose units linked by α-(1→4) or α-(1→6) glycosidic bonds. Dextrins can be produced from starch using enzymes like amylases or, for example, by applying dry heat under acidic conditions (pyrolysis). Dextrins produced by heat are also known as pyrodextrins. Dextrins are partially or fully water-soluble and typically yield solutions of low viscosity.

As outlined above, in a second aspect, the present invention relates to a process for preparing a starch-based adhesive, or an adhesive based on a starch derivative.

Most starches contain 20-30% by weight of amylose, although certain specialty types can have as little as 0% or as high as 80%. Because of the amylose fraction, starch suspended in cold water is initially unable to act as an adhesive because the starch is so tightly bound in crystalline regions. These granules must be opened through processing to obtain adhesive bonding. Heating in water is the simplest method of breaking up starch granules. On heating in water, starch granules first swell and then burst open with a resulting thickening of the suspension. The temperature at which this thickening of the suspension occurs is called the gelation temperature.

In embodiments of the present invention, the maximum temperature reached in step (i) is 37 degrees Celsius. In embodiments of the present invention, the maximum temperature reached in step (ii) is 35 degrees Celsius.

The process may comprise the following. In a first embodiment, salts (preferably the chlorides of metals such as calcium, magnesium and zinc) are added to a suspension of the starch (derivative) in the solvent, and the adhesive is produced by controlling temperature and viscosity by way of controlling the time of stirring.

In case caustic soda is added to the starch suspension; the product may be neutralized with acid (buffer) later in the process.

In embodiments of the present invention, (modified) starch-based adhesives are formulated with at least one sodium tetraborate ("borax"), as added in step (ii) or in step (iii). Borax typically provides good adhesion (tack) and machining properties. Borax is generally added in amounts of up to 10% w/w, based on the weight of the dry starch. Sodium hydroxide is preferably added to convert the borax to the more active sodium metaborate.

Plasticizers are sometimes used to control brittleness of the adhesive line and to regulate the speed of drying. Common plasticizers include glycerin, glycols, sorbitol, glucose and sugar. These types of plasticizers may act as a hygroscopic agent to decrease the drying rate of the film. Plasticizers based on saps, polyglycols and sulfonated oil derivates lubricate the layers within the dried adhesive and, thus, impart flexibility. Urea, sodium nitrate, salicylic acid and formaldehyde plasticize by forming a solid solution with the dried adhesive. All of these additives, any combination thereof, or only one such additive, may added in step (i) or in step (ii).

In embodiments of the present invention, further additives may be used, such as calcium chloride, urea, sodium nitrate, thiourea and guanidine salts are used as liquefiers to reduce viscosity. These additives may be added at about 5-20% based on dry starch. Improved cold-water resistance may be achieved by adding polyvinyl alcohol or polyvinyl acetate blends. These adhesives will also dissolve in hot water, which is often a benefit. Optimal moisture resistance may be achieved through the addition of thermosetting resins, such as urea formaldehyde or resorcinol formaldehyde.

Mineral fillers, such as kaolin clay, calcium carbonate and titanium dioxide, may be added in step (i), step (ii) or after step (iii), to reduce cost and control penetration into porous substrates. These additives may be added at concentrations of 5-50%.

Other additives that may be added in step (i), step (ii) or after step (iii), include but are not limited to preservatives, bleaches, and defoamers. Preservatives that are preferred to prevent microbial activity include formaldehyde (35% solids) at 0.02-1.0%, copper sulfate at about 0.2%, zinc sulfate, benzoates, fluorides and phenols. Preferred bleaching agents include sodium bisulfite, hydrogen and sodium peroxide, and sodium perborate. Organic solvents may be added to improve adhesion to waxed surfaces.

As discussed above in the third and fourth aspect, microfibrillated cellulose may be advantageously used to modify the rheology of adhesives, in particular starch based (or starch derivative based) adhesives. This use is particularly advantageous for making corrugated cardboards (boxboards).

Most corrugated boxboard for making cartons is bonded with starch-based adhesives. A fraction of the starch needed to formulate the adhesive is swelled or gelatinized with aqueous caustic. This is blended with a concentrated suspension of unmodified starch. A typical starch-adhesive formulation also includes borax (to increase wet tack and speed curing), and a small quantity of preservatives (for use as a mold inhibitor). The paste is applied to the corrugated flutes and the liners. Upon subsequent exposure to heat, the starch granules swell and burst, forming a strong bond.

Figure 7:
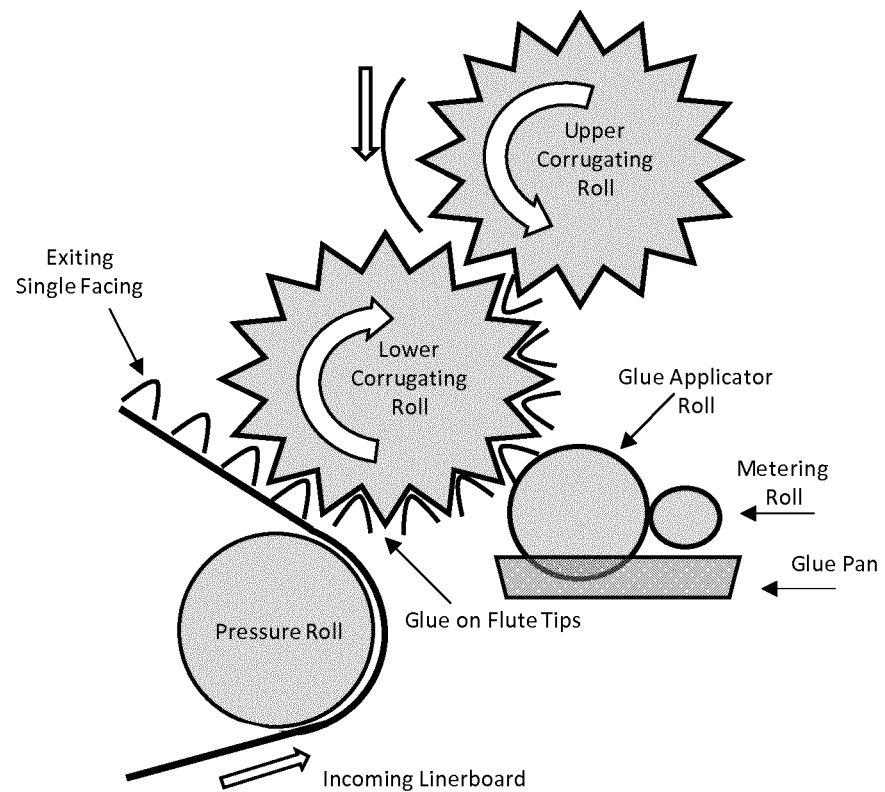
FIG. 7 schematically depicts a continuous production line for making corrugated cardboard (single facer).

FIG. 7 schematically depicts a continuous production line for making corrugated cardboard (single facer).

Figure 8:
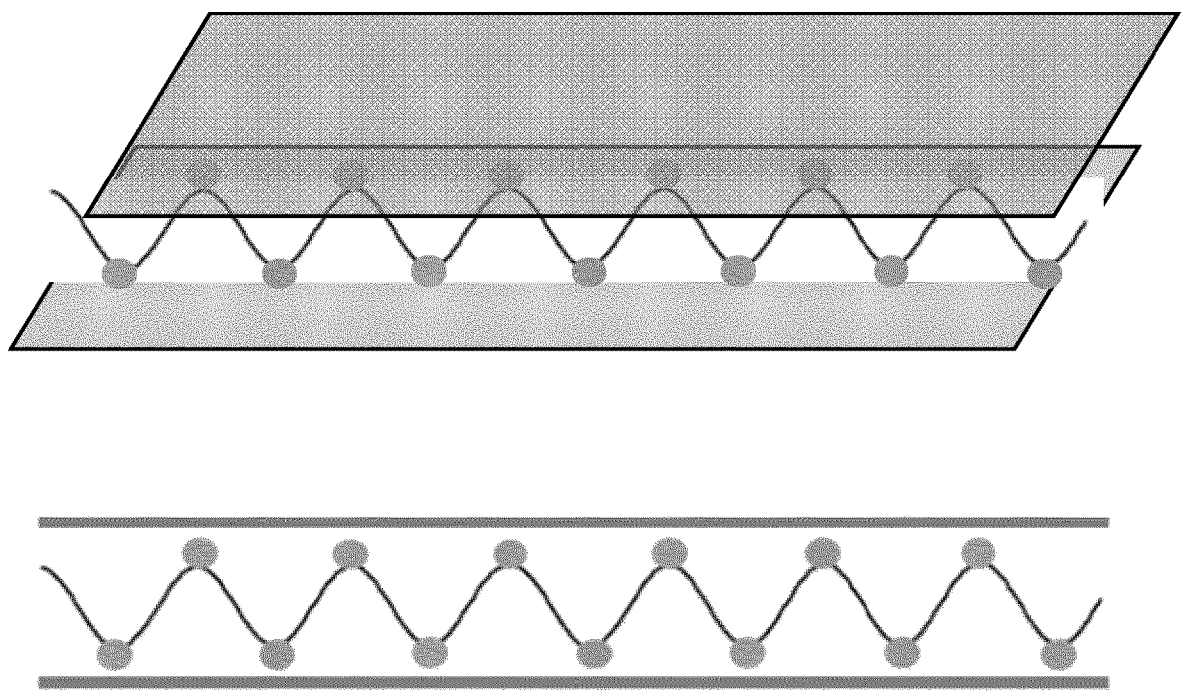
FIG. 8 schematically depicts a layer of cardboard comprising one layer of corrugated paper having the flutes tips coated with adhesive as well as an upper and a lower liner.

FIG. 8 schematically depicts a layer of cardboard comprising one layer of corrugated paper having the flutes tips coated with adhesive as well as an upper and a lower liner. A schematic illustration of "fluted" ("corrugated") piece of paper, i.e. a piece of paper that has been brought into contact with heat or steam, or both, on corrugating rolls, in order to have a corrugated ("fluted") shape is illustrated, which also shows how to exemplary apply glue to the tips of the flutes. In embodiments of the present invention, the glue may be applied along the entire tip or only along parts thereof. The figure also illustrates an upper and a lower liner as applied onto the upper and lower tips of the fluted paper, called single facer and double backer side of the board, resulting in a single walled cardboard.

Experiments were run on a corrugator machine from BHS (wet end) and Fosber (dry end) (see Example 3 below) for making corrugated cardboard. These experiments have shown that using a starch based adhesive comprising microfibrillated cellulose (as described below in the Examples Section) leads to the following advantages, among others:

an increase in production speed of up to 40%, while achieving equal or better quality cardboard, thus saving time and facilitating the post process steps due to flatter boards.

an increase in bond strength between the flute and liners of the board.

This translates to saving time and processing costs [less heat (energy) needed for curing due to less water to evaporate when less adhesive is applied; deduced water impact/defects/warp on the paper during process and post process: achieves flatter cardboards].

"Microfibrillated cellulose" (MFC) in accordance with the present invention is to be understood as relating to cellulose fibers that have been subjected to a mechanical treatment resulting in an increase of the specific surface and a reduction of the size of cellulose fibers, in terms of cross-section (diameter) and/or length, wherein said size reduction preferably leads to "fibrils" having a diameter in the nanometer range and a length in the micrometer range.

Microfibrillated cellulose (also known as "reticulated" cellulose or as "superfine" cellulose, or as "cellulose nanofibrils", among others) is a cellulose-based product and is described, for example, in U.S. Pat. Nos. 4,481,077, 4,374,702 and 4,341,807. According to U.S. Pat. No. 4,374,702 ("Turbak"), microfibrillated cellulose has distinct properties vis-à-vis cellulose products not subjected to the mechanical treatment disclosed in U.S. Pat. No. 4,374,702. In particular, the microfibrillated cellulose described in these documents has reduced length scales (diameter, fiber length), improved water retention and adjustable viscoelastic properties. MFC with further improved properties and/or properties tailormade for specific applications is known, among others, from WO 2007/091942 and WO 2015/180844.

In cellulose, which is the starting product for producing microfibrillated cellulose (typically present as a "cellulose pulp"), no, or at least not a significant or not even a noticeable portion of individualized and "separated" cellulose "fibrils" can be found. The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 µm (with the length of these fibres being even greater). When the cellulose fibres are microfibrillated, a heterogeneous mixture of "released" fibrils with cross-sectional dimensions and lengths from nm to µm may result. Fibrils and bundles of fibrils may co-exist in the resulting microfibrillated cellulose.

In the microfibrillated cellulose ('MFC') as described throughout the present disclosure, individual fibrils or fibril bundles can be identified and easily discerned by way of conventional optical microscopy, for example at a magnification of 40×, and/or by electron microscopy.

In principle, any type of microfibrillated cellulose (MFC) can be used in accordance with the present invention, as long as the fiber bundles as present in the original cellulose pulp are sufficiently disintegrated in the process of making MFC so that the average diameter of the resulting fibers/fibrils is in the nanometer-range and therefore more surface of the overall cellulose-based material has been created, vis-à-vis the surface available in the original cellulose material. MFC may be prepared according to any of the processes described in the art, including the prior art specifically cited in the "Background"-Section above.

In accordance with the present invention, there is no specific restriction in regard to the origin of the cellulose, and hence of the microfibrillated cellulose. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g. from tunicates.

In a preferred embodiment, wood-based materials are used as raw materials, either hardwood or softwood or both (in mixtures). Further preferably softwood is used as a raw material, either one kind or mixtures of different soft wood types. Bacterial microfibrillated cellulose is also preferred, due to its comparatively high purity.

In principle, the microfibrillated cellulose in accordance with the present invention may be unmodified in respect to its functional groups or may be physically modified or chemically modified, or both. In preferred embodiments, the microfibrillated cellulose is non-modified or physically modified, preferably non-modified.

Chemical modification of the surface of the cellulose microfibrils may be achieved by various possible reactions of the surface functional groups of the cellulose microfibrils and more particularly of the hydroxyl functional groups, preferably by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

The cellulose microfibrils may, in principle, also be modified by a physical route, either by adsorption at the surface, or by spraying, or by coating, or by encapsulation of the microfibril. Preferred modified microfibrils can be obtained by physical adsorption of at least one compound. The MFC may also be modified by association with an amphiphilic compound (surfactant).

In a preferred embodiment of the present invention, the microfibrillated cellulose as used in step (iii) is prepared by a process, which comprises at least the following steps:
(a) subjecting a cellulose pulp to at least one mechanical pretreatment step;
(b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose;
wherein the homogenizing step (b) involves compressing the cellulose pulp from step (a) and subjecting the cellulose pulp to a pressure drop.

The mechanical pretreatment step preferably is or comprises a refining step. The purpose of the mechanical pretreatment is to "beat" the cellulose pulp in order to increase the accessibility of the cell walls, i.e. to increase the surface area.

A refiner that is preferably used in the mechanical pretreatment step comprises at least one rotating disk. Therein, the cellulose pulp slurry is subjected to shear forces between the at least one rotating disk and at least one stationary disk.

Prior to the mechanical pretreatment step, or in addition to the mechanical pretreatment step, enzymatic (pre)treatment of the cellulose pulp is an optional additional step that may be preferred for some applications. In regard to enzymatic pretreatment in conjunction with microfibrillating cellulose, the respective content of WO 2007/091942 is incorporated herein by reference. Any other type of pretreatment, including chemical pretreatment is also within the scope of the present invention.

In the homogenizing step (b), which is to be conducted after the (mechanical) pretreatment step, the cellulose pulp slurry from step (a) is passed through a homogenizer at least once, preferably at least two times, as described, for example, in PCT/EP2015/001103, the respective content of which is hereby incorporated by reference.

EXAMPLES

Example 1

Preparation of Microfibrillated Cellulose (MFC)

MFC as used to make the compositions in accordance with the present invention is commercially available and commercialized, for example, by Borregaard as "Exilva Microfibrillated cellulose PBX 01-V", based on cellulose pulp from Norwegian spruce (softwood).

The MFC used in the example was present as a paste, having a solids content of 10%, i.e. the dry matter content of microfibrillated fibers in the MFC paste was 10%, while the remaining 90% were water, which was the sole solvent in this case.

Example 2

Preparation of a Starch Based Adhesive Comprising Borax (Comparative Example)

A starch-based adhesive as known from the art was prepared based on the following components and using the following steps:
750 kg of primary water
180 kg of primary starch (wheat)
Stirring for 30 sec, temperature 36.5° C.; add:
100 kg of water
16.5 kg Primary caustic soda 80 kg of water
Stirring for 30 sec
Viscosity control 1: 10 sec
Stirring for 840 sec
Viscosity control 2: 33.8 sec
260 kg secondary water
Disinfectant: 0.4 kg
280 kg secondary starch (wheat)
Stirring for 30 sec at a temperature of 35° C.
2.5 kg of borax
Stirring for 600 sec
Viscosity control 3, final: 28 sec Borax was added after the addition and mixing of the secondary non-swollen starch. The concentration of borax in the final formulation was 0.15%. The Lory viscosity of this starch-based adhesive according to the art including borax was decreasing readily with mixing time, at high shear.

Preparation of a Starch Based Adhesive Comprising Microfibrillated Cellulose (in Accordance with the Present Invention)

A starch-based adhesive in accordance with the present invention was prepared based on the following components and using the following steps:

750 kg of primary water
180 kg of primary wheat starch
Stirring for 30 sec, temperature 36.5° C.
100 kg of water
16.5 kg Primary caustic soda
80 kg of water
Stirring for 30 sec
Viscosity control 1: 10 sec
Stirring for 840 sec
Viscosity control 2: 33.8 sec
260 kg secondary water
Disinfectant: 0.4 kg
Temperature 35° C.
280 kg secondary wheat starch
Stirring for 30 sec
2.5 kg of borax
Stirring for 60 sec
20 kg of MFC (Exilva PBX 01-V)
Stirring for 600 sec
21 kg of water
Viscosity control 3, final: 32 sec
Lory viscosity was 34.

The adhesive consisted of a primary starch portion in which most of the granules are partially swollen, in which uncooked raw starch was suspended. Microfibrillated cellulose was added under high speed stirring (1500 rpm), after the addition and in mix of the borax. The concentration of MFC in the final formulation was 0.12%.

Lory viscosity was measured with a Lory viscosity cup (Elcometer 2215/1), which is commonly used in the adhesive, paint and coatings industry and which essentially consists of a conventional cylindrical cup with a needle fixed to the bottom. The cup is first dipped into the adhesive, which then empties through an escape hole. The flow time was measured as soon as the point of the needle was visible.

Stability Test Over Time

Both for the reference and the starch-based adhesive with MFC, the Lory viscosity and Brookfield viscosity were measured initially, and over time under laboratory conditions, i.e. at 20° C. and under standard ambient conditions. The samples were left on the bench without stirring. For the reference adhesive, the initial Lory viscosity was 36 seconds. After 1 hour, the viscosity was 137 seconds (critical viscosity), and the reference adhesive could no longer be measured by Lory viscosity without being pre-stirred for 30 seconds by a propeller mixer. After 4 hours, the viscosity of the reference adhesive was too high to be measured by Lory viscosity, even with 30 seconds pre-stirring (see FIG. 1).

For the starch-based adhesive in accordance with the present invention, i.e. the adhesive with MFC, the initial Lory viscosity was 34 and only increased to 43 seconds 1 and 2 hours after preparation. Moreover, the Lory viscosity was still measurable 22.5 hours after preparation and the critical viscosity limit for measuring Lory viscosity was not reached before 25 hours after preparation. After 25 hours, pre-stirring with propeller mixer for 30 seconds had to be performed before the measurements. The final measurement of Lory viscosity was performed 94 hours after the adhesive was prepared (see FIG. 2).

Figure 2:
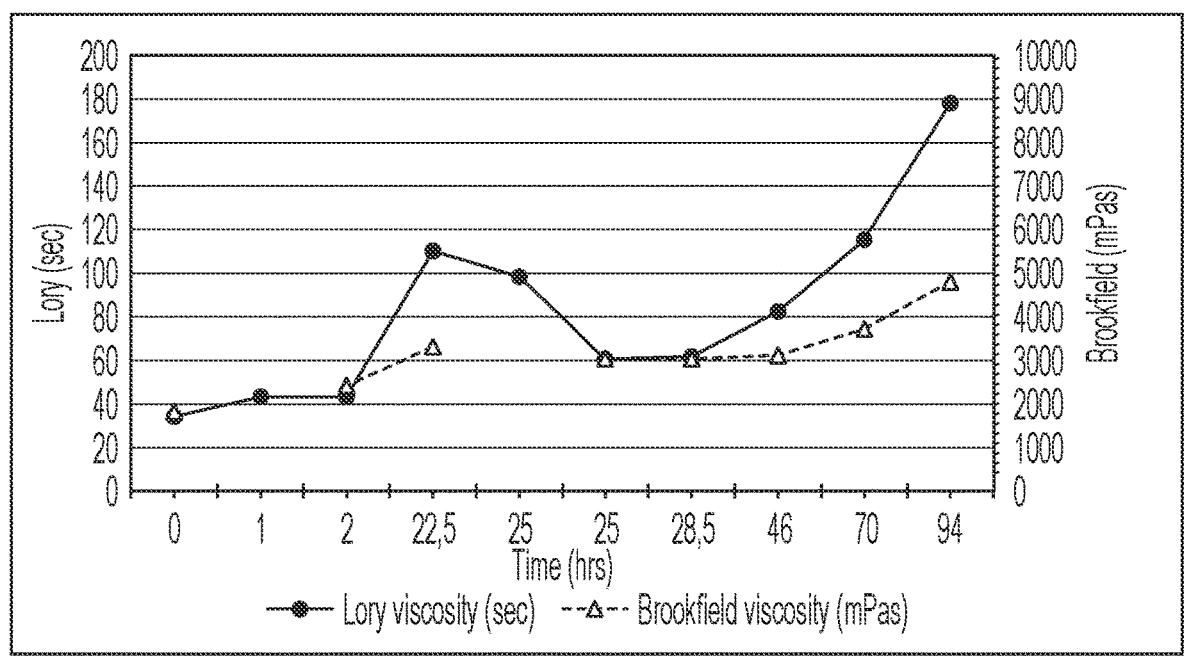
FIG. 2 is a plot of viscosity vs. time for a starch-based adhesive with MFC for Example 2 (details below).

Brookfield viscosity measurements for the reference starch-based adhesive and the starch-based adhesive with MFC, likewise show a slower increase in viscosity over time with MFC added to the starch-based adhesive (see FIGS. 1 and 2). Brookfield viscosity was measured with Brookfield Viscometer—RVT model, spindle no. 4.

Overall, the viscosity measurements consistently demonstrate that the starch-based adhesive comprising microfibrillated cellulose is far more stable in regard to viscosity and over time than the reference starch-based adhesive without microfibrillated cellulose.

Example 3

Figure 3:
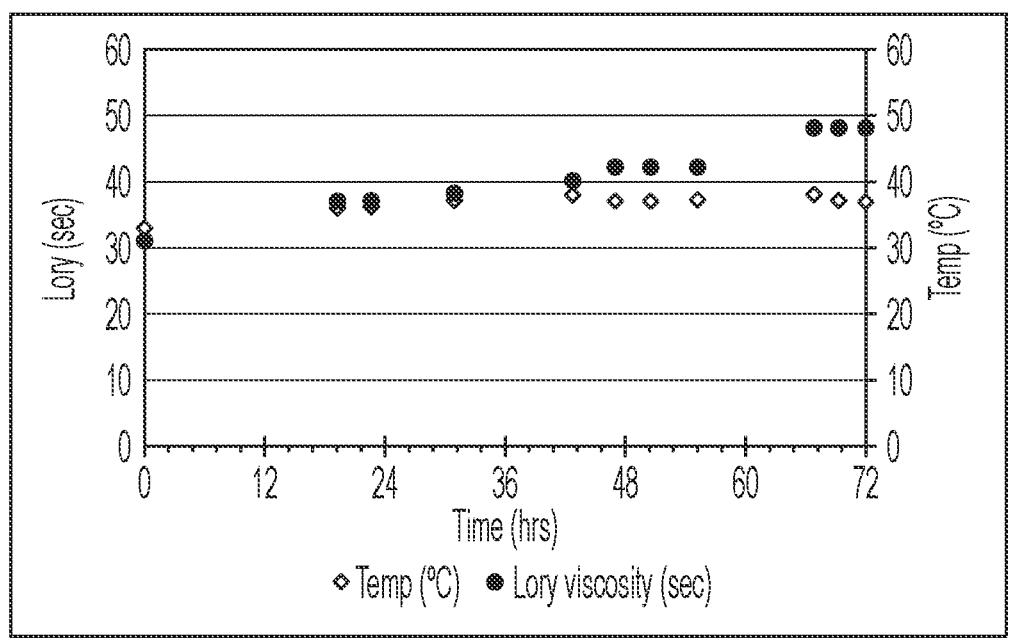
FIG. 3 is compound plot showing viscosity vs. time (left) and temperature vs. time (right) for Example 3.

Testing the Starch Based Adhesive in Accordance with the Present Invention in Corrugated Cardboards The Lory viscosity and temperature for the starch-based adhesive with MFC were also measured over time in the storage tank, see FIG. 3. To prevent sedimentation and reduce the viscosity of the starch-based adhesives, the glues are stirred for 5 minutes every hour. For the starch-based adhesive with MFC the sufficient time between the stirring was tested: The first 24 hours of storage, the adhesive was stirred for 5 minutes every hour, after 24-48 hours the stirring was 5 minutes every third hour, and from 48-72 hours the adhesive was stirred for 5 minutes every fourth hour. Compared to the reference starch-based adhesive, the frequency of stirring during storage was significantly reduced for the adhesive with MFC.

The Lory viscosity of the starch-based adhesive with MFC was measured to be 48 seconds after 72 hours storage in tank and the starch-based adhesive could be used directly without adjustment with water for the production of corrugated boards. The temperature of the starch-based adhesive in the tank was 37° C. (see FIG. 3).

Both the starch-based adhesive with MFC (72 hours) and the reference starch-based adhesive (fresh) were tested on quality BB25b.

TABLE 1

| Standard tests | | |
|---|---|---|
| Conditions | Grammage | Adhesion strength |
| 23° C. – 50 RH % ISO 187 | $g/m^2$ 1SO 536 | N/m Fefco nr.11 |

As for making corrugated cardboards, a corrugator from BHS (wet end) and Fosber (dry end) was used, which is a set of machines designed to bring together several sheets of paper to form single, double or triple wall board in a continuous process. The process starts with a paper sheet conditioned with heat and steam on corrugating rolls in order to be given its fluted shape in the single facer.

Starch-based adhesive is then applied to the tips of the flutes on one side and the inner liner is glued to the fluting (see FIGS. 7 and 8 for a schematic depiction of such a process). The corrugated fluting medium with one liner attached to it (single facer) is then brought to the double backer where the outer liner is glued to the single facer.

Figure 4:
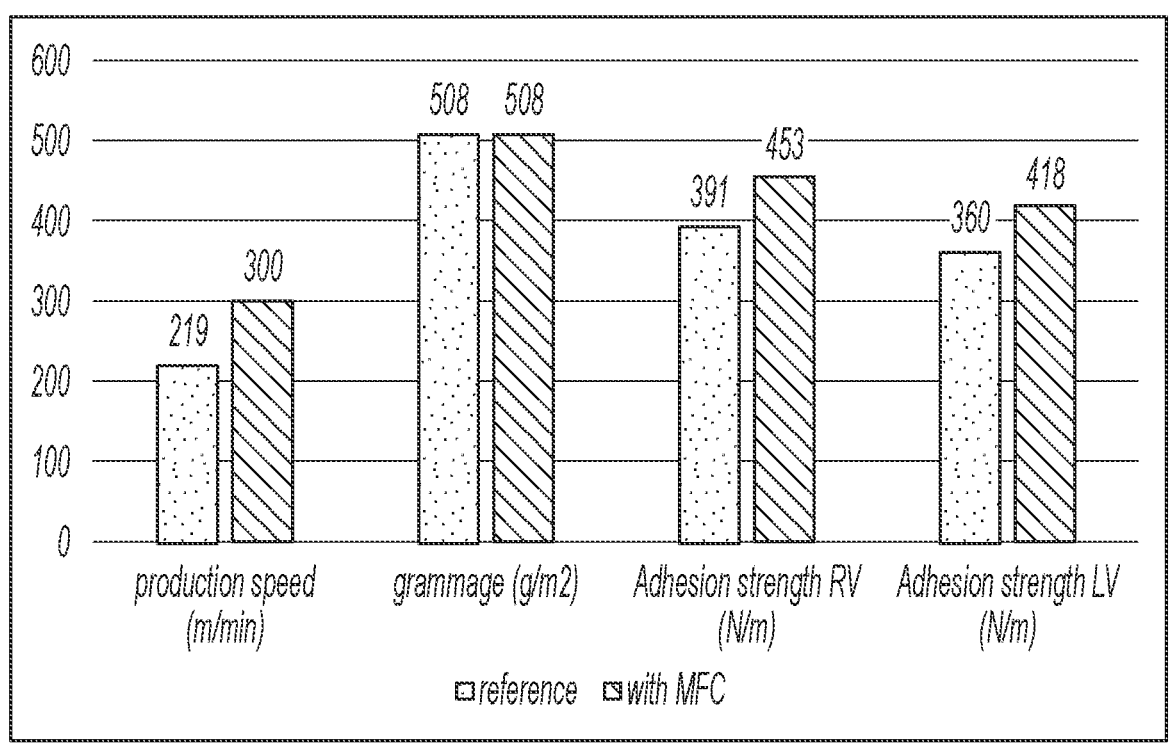
FIG. 4 is a plot showing a comparison of the grammage and adhesion strength of corrugated boards, comparing a reference sample to a sample with MFC for Example 3 (details below).

FIG. 4 shows a comparison of the grammage and adhesion strength of corrugated boards, using the reference starch-based adhesive run at 219 m/min (left column) compared to the starch-based adhesive with MFC run at 300 m/min (right column, respectively).

It is noteworthy that the reference adhesive tested was a fresh glue made the same day as the corrugated boards production, while the glue with MFC was 72 hours old and was used with no addition of water.

It can be seen from FIG. 4 that the starch-based adhesive containing MFC provides greater adhesion strength to the corrugated boards (on both sides, inner and outer liner, respectively RV and LV), even when the production is run 37% faster. Since the grammage of the cardboard was similar for both adhesives, the improvement of the adhesion strength can be compared and improvements can be attributed to the better performance of the starch-based adhesive with MFC. It was also observed that the boards produced with the MFC starch-based adhesive were flatter than the boards produced with the reference starch adhesive.

Overall, the viscosity of the starch-based adhesive with MFC is unexpectedly stable over a long period of time, in particular during storage (at least 72 hours) contrary to a starch-based adhesive without MFC, the viscosity of which increases dramatically already after 1 hour.

Moreover, the starch-based adhesive with MFC is usable for corrugated board production even after 72 hours storage and performs even better than a fresh made reference at high speed production. Therefore production can be run at faster speeds, while better quality and flatter boards are obtained.

Figure 5:
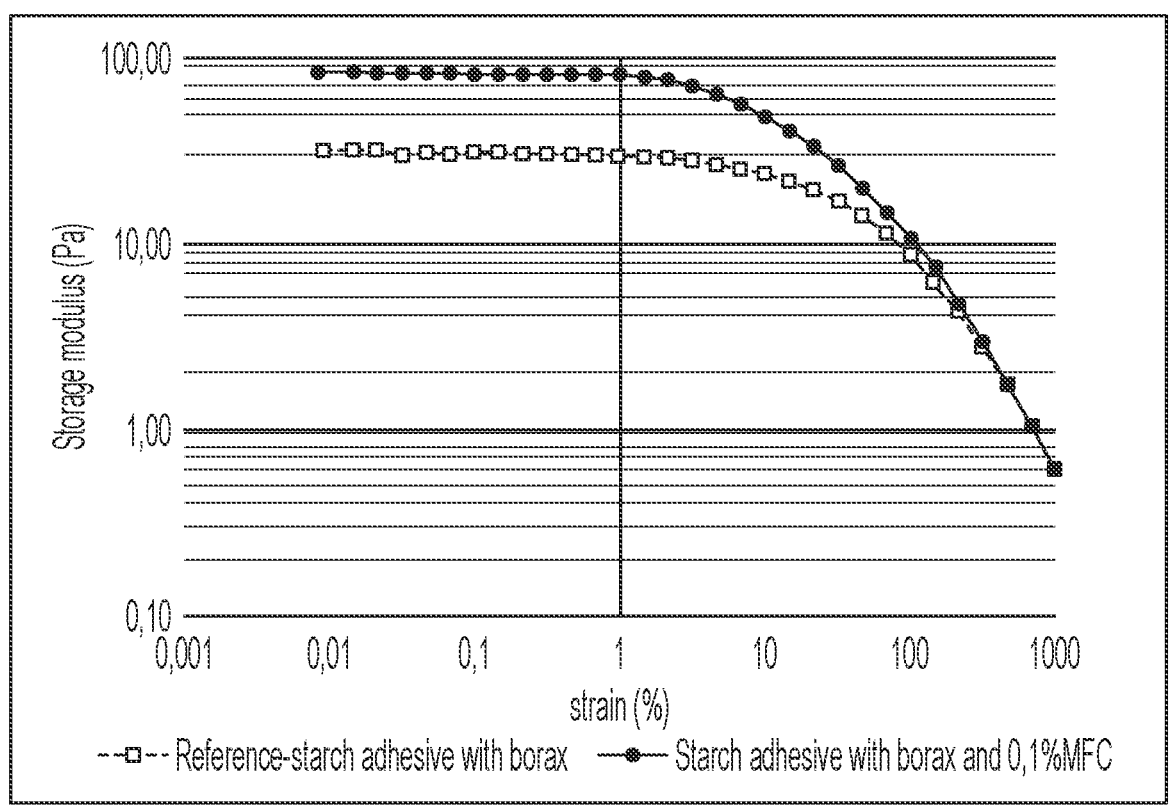
FIG. 5 is a plot of storage modulus vs. strain for a reference sample and a starch adhesive with MFC for Example 3 (details below).
Figure 6:
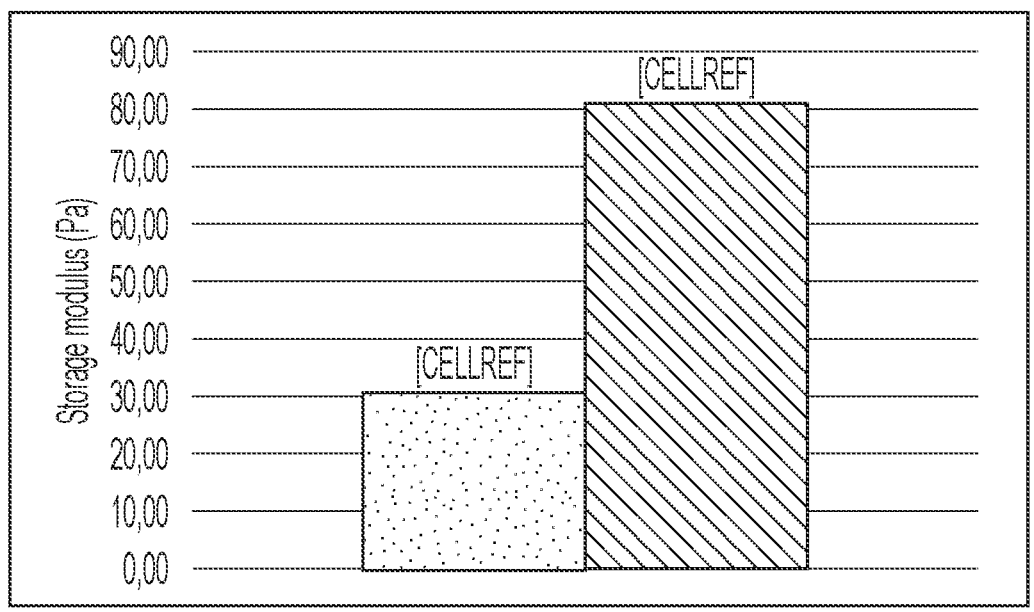
FIG. 6 is a chart of storage modulus for a reference sample and a starch adhesive with MFC for Example 3 (details below).

Finally, as can be seen from FIG. 5 (upper curve: starch based adhesive with borax and microfibrillated cellulose; lower curve: starch-based adhesive with borax but no microfibrillated cellulose) and from FIG. 6 (left column: no microfibrillated cellulose), using microfibrillated cellulose as an additive increases the storage modulus of the adhesive (measured by amplitude sweep at 25° C.).

Example 4

Figure 9:
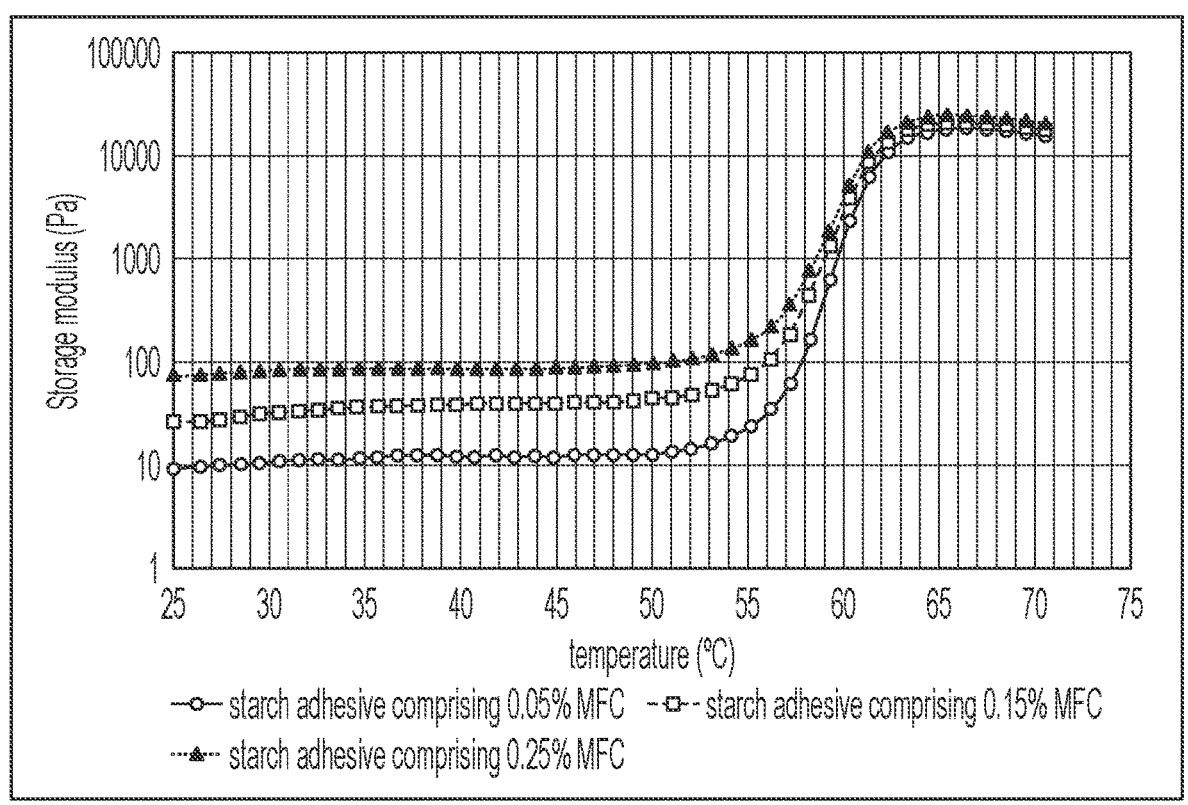
FIG. 9 is a plot of storage modulus vs. temperature for three compositions of starch adhesive, each with different MFC amounts for Example 4 (details below).
Figure 10:
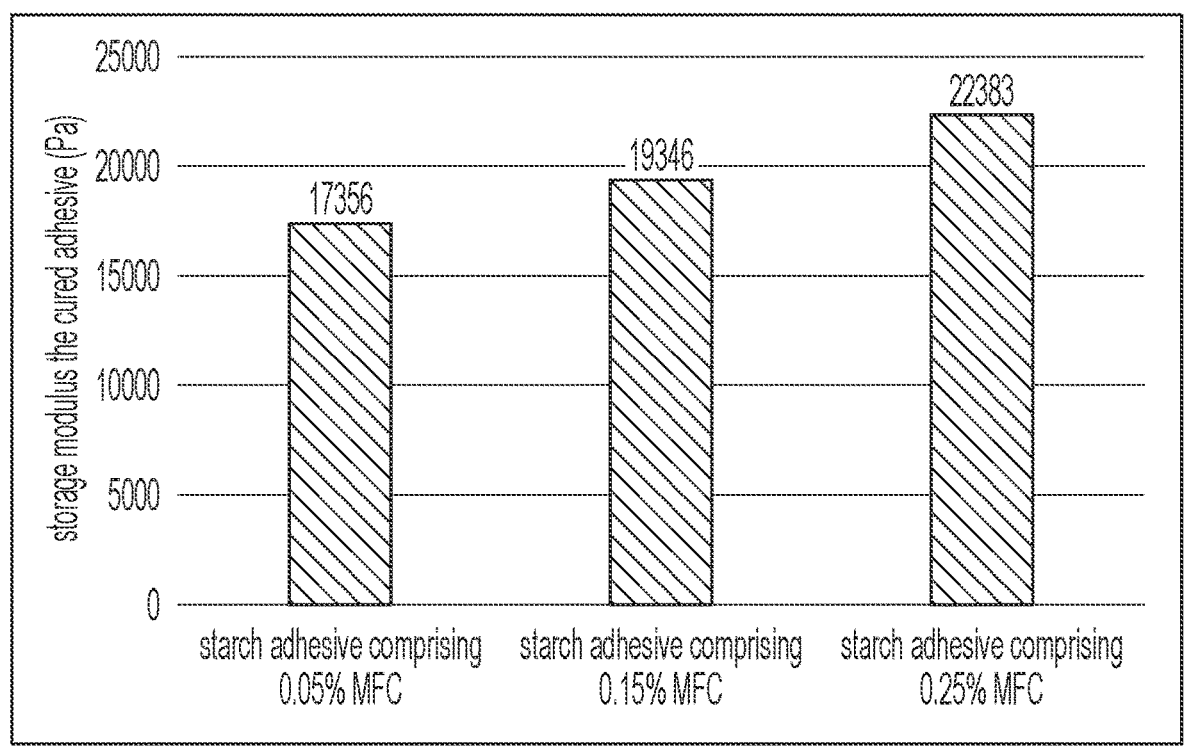
FIG. 10 is a chart of storage modulus for a cured adhesive for the three compositions shown in FIG. 9 for Example 4 (details below).

The Effect of MFC Concentration on the Gelatinization Speed and Storage Modulus of the Cured Adhesive FIG. 9 and FIG. 10 show the effect of MFC concentration on the gelatinization speed of the starch adhesive, and storage modulus of the cured adhesive. The solid content and caustic soda concentration are equal for the three glues, which do not comprise borax. The MFC content varies from 0.05 to 0.25 w-% of the overall adhesive composition. The higher the MFC concentration, the higher the storage modulus of the cured adhesive and the stronger the cured adhesive becomes (see FIG. 10), which clearly demonstrates that the microfibrillated cellulose in concentrations up to 0.25% w/w is contributing to an increased bond strength. In addition to that, the higher the concentration of MFC, the slower the gelatinization speed and the longer the open time of the adhesive is (see FIG. 9). The advantage of a long open time in a full scale production is that there is more time to adjust for warps on the boards which results in flatter and more stable boards. Furthermore, the longer the "open" time, the more time for the secondary starch to fully gelatinize, and for the formation of a strong entangled microfibrillar cellulose-starch gel network. In fact, the MFC concentration can be varied to control the bond strength of the adhesive as well as its open time, allowing for a better control of the warps and an overall better quality of the corrugated boards.

Example 5

The Rheology and Viscosity Stabilizing Effect of MFC Upon High Shearing Impact

Figure 11:
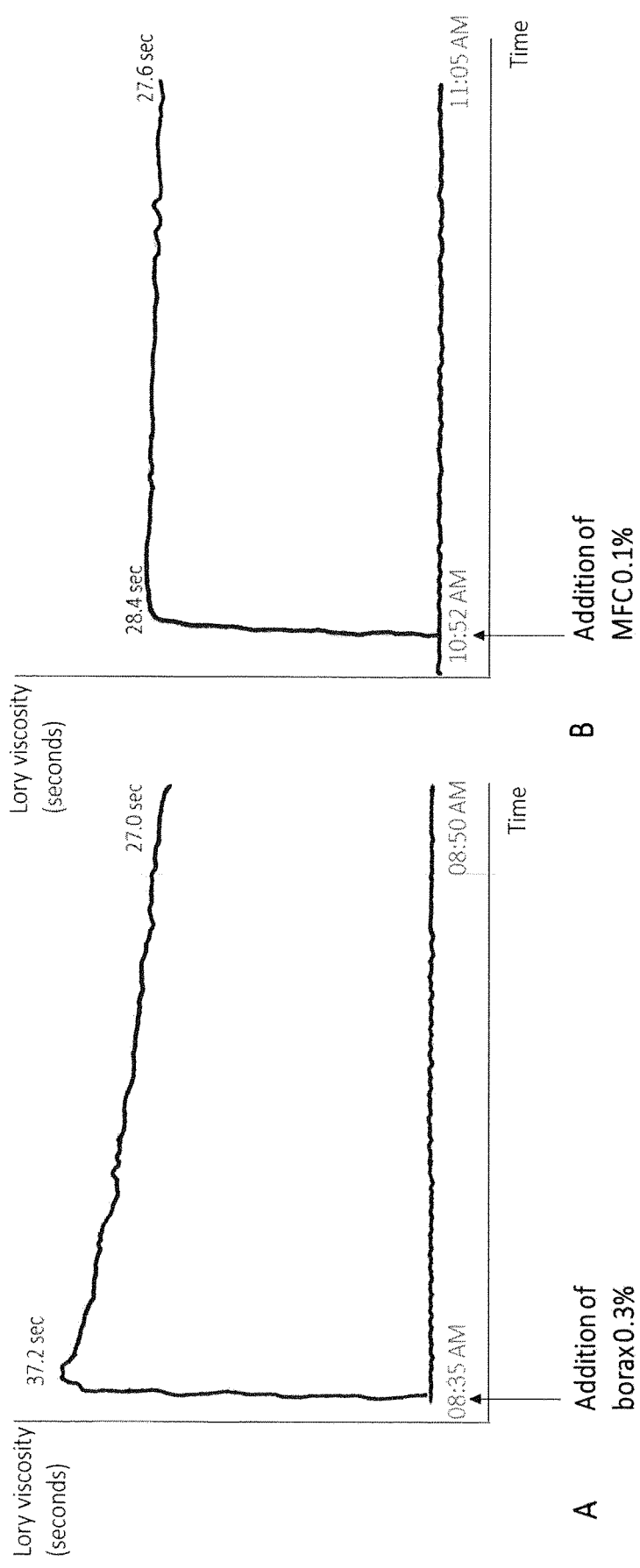
FIG. 11 shows plots of Lory viscosity vs. time for a reference starch adhesive comprising 0.3% borax (panel A) and a starch adhesive comprising 0.1% MFC and no borax (panel B) for Example 5 (details below).

The microfibrillated cellulose is providing an extremely high shear stable viscosity, here shown for a Stein-Hall starch adhesive comprising 0.1% MFC and no borax (FIG. 11, panel B). After an instant increase in viscosity upon addition of MFC, the viscosity remains constant under high shear stirring for 15 minutes (FIG. 11, panel B). In comparison, the viscosity of the reference adhesive comprising 0.3% borax (FIG. 11, panel A), decreased by 27% after 15 minutes of high shear stirring. When preparing a starch adhesive with MFC, a target viscosity of the adhesive can be predetermined and achieved, regardless of stirring time during manufacturing, before it is used on the corrugator or transferred to the storage tank. Having a viscosity stable starch adhesive, which is provided by MFC, the corrugator can be run with the same settings for the adhesive over time, facilitating a continuous production and high production volumes of corrugated boards. This Example shows that MFC can be used advantageously to replace parts or all of the borax as typically used as an additive in starch based adhesives.

The invention claimed is:

1. An adhesive composition comprising:
   at least one starch and/or at least one starch derivative, in an amount of 5% w/w to 60% w/w, dry matter, of overall adhesive composition;
   at least one solvent, in an amount of 30% w/w to 95% w/w of the overall adhesive composition; and
   microfibrillated cellulose in an amount of 0.001% w/w to 10% w/w, dry matter, of the overall adhesive composition, wherein a diameter of the microfibrillated cellulose is in nanometer range, and wherein the microfibrillated cellulose has a Schopper-Riegler (SR) method value of below 95, as determined according to EN ISO 5267-1 (in the version of 1999), or, in the alternative, cannot be reasonably measured in accordance with the SR method, as fibers of the MFC are so small that a large fraction of the fibers simply pass through a screen as defined in the SR method.

2. The composition according to claim 1, wherein at least one of (i) the amount of microfibrillated cellulose in said composition is from 0.01% dry matter, relative to overall weight of said composition, to 10%; (ii) the amount of microfibrillated cellulose in said composition is from 0.02% w/w relative to the overall weight of the composition to 8% w/w; and (iii) the amount of microfibrillated cellulose is from 0.003% w/w to 22% w/w, as measured relative to an overall amount of starch in said composition.

3. The composition according to claim 2, wherein at least one of (i) the amount of microfibrillated cellulose in said composition is from 0.05% dry matter, relative to the overall weight of the composition, to 2%; (ii) the amount of microfibrillated cellulose in said composition is from 0.05% w/w relative to the overall weight of the composition to 0.5% w/w; and (iii) the amount of microfibrillated cellulose is from 0.2% w/w to 1.4% w/w, as measured relative to the overall amount of starch in said composition.

4. The composition according to claim 2, wherein at least one of (i) the amount of microfibrillated cellulose in said composition is from 0.05% dry matter, relative to the overall weight of the composition, to 0.15%; (ii) the amount of microfibrillated cellulose in said composition is from 0.05% w/w relative to the overall weight of the composition to 0.5% w/w; and (iii) the amount of microfibrillated cellulose is from 0.2% w/w to 0.6% w/w, as measured relative to the overall amount of starch in said composition.

5. The composition according to claim 1, wherein an overall amount of starch in said composition is from 15% w/w to 50% w/w of the overall adhesive composition.

6. The composition according to claim 1, wherein the pH value of the adhesive composition is from 8 to 14.

7. The composition according to claim 1, wherein the at least one starch is a native starch, or a chemically or physically modified starch, or a starch derivative, or a mixture thereof.

8. The composition according to claim 1, wherein the microfibrillated cellulose is characterized in that it results in gel-like dispersion that has a zero shear viscosity, go, of at least 2000 Pas, as measured in polyethylene glycol (PEG), and at a solids content of the microfibrillated cellulose of 0.65%.

9. The composition according to claim 1, wherein the microfibrillated cellulose is characterized by a water holding capacity of more than 30, as measured by diluting MFC samples to a 0.3% solids content in water, and then centrifuging the samples at 1000 G for 15 minutes, after which a clear water phase is separated from sediment and the sediment is weighed, wherein the water holding capacity is given as $(mV/mT)^{-1}$ wherein mV is the weight of the sediment when wet and mT is the weight of dry MFC analyzed.

10. The composition according to claim 1, wherein the microfibrillated cellulose is a non-modified (native) microfibrillated cellulose.

11. A method comprising:
providing an adhesive composition according to claim 1; and
manufacturing a corrugated paperboard/cardboard using the adhesive composition.

12. A process for making corrugated paperboards or cardboards, said process comprising at least the following steps:
providing a starch-based adhesive composition according to claim 1;
applying said starch-based adhesive composition to at least a part of tips of flutes of a corrugated pieces of paper, on at least one side; and
in a corrugator, applying at least one liner onto said corrugated piece of paper, and
preparing a single, double, triple or further multiple wall cardboard.

13. A corrugated paperboard or cardboard having at least one flute and at least one liner and comprising an adhesive composition according to claim 1.

14. The composition according to claim 1, wherein the microfibrillated cellulose is a non-modified microfibrillated cellulose derived from plant material.

15. A process for preparing a starch-based adhesive, or an adhesive based on a starch derivative, the process comprising the steps of:
(a) mixing at least one starch and/or at least one starch derivative, or a mixture thereof, with at least one solvent comprising water;
(b) during or after step (a): adding microfibrillated cellulose; and
(c) dispersing the mixture of (b) until a homogenous mixture is obtained,
wherein a diameter of the microfibrillated cellulose is in nanometer range, and wherein the microfibrillated cellulose has a Schopper-Riegler (SR) method value of below 95, as determined according to EN ISO 5267-1 in the version of 1999), or, in the alternative, cannot be reasonably measured in accordance with the SR method, as fibers of the MFC are so small that a large fraction of the fibers simply pass through a screen as defined in the SR method.

16. The process according to claim 15, wherein a viscosity of the mixture increases by at least 10% in step (b) and relative to viscosity of the mixture of step (a).

17. The process according to claim 15, wherein in step (a), first a primary starch is added to a solvent, then in or after step (a), a secondary starch is added, wherein the secondary starch is the same or a different starch or starch derivative as the primary starch.

18. The process of claim 15, wherein the starch-based adhesive or adhesive based on a starch derivative is a composition and at least one of (i) the amount of microfibrillated cellulose in said composition is from 0.001% dry matter, relative to overall weight of said composition, to 10%; (ii) the amount of microfibrillated cellulose in said composition is from 0.02% w/w relative to the overall weight of the composition to 8% w/w; and (iii) the amount of microfibrillated cellulose is from 0.003% w/w to 22% w/w, as measured relative to an overall amount of starch in said composition.

19. The process of claim 15, wherein step (a) and/or step (b) comprises adding alkaline in a ratio of dry alkaline relative to dry starch of from 0.1% w/w to 3% w/w.

20. A method comprising using microfibrillated cellulose as a rheology modifying agent in an adhesive comprising a starch and/or starch derivatives, wherein a diameter of the microfibrillated cellulose is in nanometer range, and wherein the microfibrillated cellulose has a Schopper-Riegler (SR) method value of below 95, as determined according to EN ISO 5267-1 (in the version of 1999), or, in the alternative, cannot be reasonably measured in accordance with the SR method, as fibers of the MFC are so small that a large fraction of the fibers simply pass through a screen as defined in the SR method.

* * * * *